(12) United States Patent
Kushnirskiy

(10) Patent No.: US 9,075,920 B1
(45) Date of Patent: Jul. 7, 2015

(54) INTEGRATING SOFTWARE-TESTS WITH SOFTWARE DEVELOPMENT ENVIRONMENTS OR TOOLS THAT CAN ASSIST SOFTWARE-TESTING

(75) Inventor: Igor D. Kushnirskiy, Ithaca, NY (US)

(73) Assignee: Oracle America, Inc., Redwood City, CA (US)

( * ) Notice: Subject to any disclaimer, the term of this patent is extended or adjusted under 35 U.S.C. 154(b) by 2141 days.

(21) Appl. No.: 11/187,685

(22) Filed: Jul. 22, 2005

(51) Int. Cl.
*G06F 9/44* (2006.01)
*G06F 9/45* (2006.01)
*G06F 11/36* (2006.01)

(52) U.S. Cl.
CPC .................................. *G06F 11/3696* (2013.01)

(58) Field of Classification Search
USPC .......... 717/124–135, 138; 714/37, 38; 703/22
See application file for complete search history.

(56) References Cited

U.S. PATENT DOCUMENTS

| | | | |
|---|---|---|---|
| 6,321,376 B1 * | 11/2001 | Willis et al. .................... | 717/124 |
| 6,442,749 B1 * | 8/2002 | Hirao et al. .................... | 717/170 |
| 6,536,035 B1 * | 3/2003 | Hawkins ........................ | 717/100 |
| 7,293,253 B1 * | 11/2007 | Soukup .......................... | 717/108 |
| 2003/0121025 A1 * | 6/2003 | Farchi et al. .................... | 717/124 |
| 2003/0149949 A1 * | 8/2003 | Price et al. ...................... | 716/4 |
| 2004/0103413 A1 * | 5/2004 | Mandava et al. .............. | 718/100 |
| 2005/0028147 A1 * | 2/2005 | Bonilla .......................... | 717/138 |
| 2005/0114838 A1 * | 5/2005 | Stobie et al. ................... | 717/124 |

OTHER PUBLICATIONS

"Accelerate Your Development," Technical Overview, Borland® Jbuilder® 2005, pp. 1-2.
"JUnit a Cook's Tour," http://junit.sourceforge.net/doc/cookstour/cookstour.htm, pp. 1-12.
"JUnit," http://junit.sourceforge.net/, pp. 1-2.
"JUnit Test Infected: Programmers Love Writing Tests," http://junit.sourceforge.net/doc/testinfected/testing.htm, pp. 1-12.
"JDT UI Component Development Resources," pp. 1-4.
Kölling et al., "Unit Testing in BlueJ," Version 1.0 for BlueJ Version 1.3.0, University of Southern Denmark, pp. 1-17.
"JUnit Testing Resources for Extreme Programming," http://jfunc.sourceforge.net/, pp. 1-7.
"IntelliJIDEA—The Most Inteligent Java IDE," http://www.jetbrains.com/idea/, 4 pages.

* cited by examiner

*Primary Examiner* — Hang Pan
(74) *Attorney, Agent, or Firm* — Polsinelli PC

(57) ABSTRACT

A dynamic-bridge connects a collection of tests (e.g., proprietary tests) to a testing-framework and effectively allows the collection of tests to interface with the testing-framework, thereby allowing the development environment and tools that support the testing-framework to also support the collection of tests. The dynamic-bridge provides a dynamic test wrapper which can be dynamically constructed for a test and present it as a test which conforms to or is compatible with the testing-framework and executed within the testing-framework. Test results are reported in a form that is expected or acceptable by the framework. In effect, the dynamic test wrapper simulates executing the test in the testing framework. As a result, tools which have been integrated with the testing-framework can be used to support tests which may originally not conform or be compatible with the testing-framework.

14 Claims, 9 Drawing Sheets

INTEGRATING SOFTWARE-TESTS WITH SOFTWARE DEVELOPMENT ENVIRONMENTS OR TOOLS THAT CAN ASSIST SOFTWARE-TESTING

BACKGROUND OF THE INVENTION

The invention relates to testing computer program code (or software-testing), and more particularly to techniques for allowing software-tests to be supported (e.g., integrated) with software development environments and/or tools that can assist the software-testing process.

Broadly speaking, computer program code (or software) can be tested to determine how well it works. Computer software testing (or software-testing) is becoming an increasingly more important aspect of software development. There is also a desire to more rigorously formulize testing and integrate it more closely with the software development process rather than developing code and testing it in a separate development phase (typically after code has been developed). Accordingly, extensive efforts have been made by a number of entities to develop "testing-frameworks" which can formulize testing and more closely integrate testing with other aspects of software development, so that computer program code can be tested effectively as it is being written by computer programmers. One such testing-framework is a Java™-based testing-framework primarily known to those skilled in the art as the "JUnit Testing Framework" (or JUnit).

JUnit Testing Framework (or JUint), among other things, defines the structure of test cases (or scenarios) and provides testing-tools (or tools) that can be used to run the test cases. An individual test or a collection of tests (a test suite) that conforms to the JUnit Testing Framework can be developed as program code is being developed. Junit provides a Graphical User Interface (GUI) that displays the progress and result of the test. FIG. 1A depicts an exemplary screen that demonstrates a successful execution of a test in JUnit Testing Framework.

In addition, JUnit Testing Framework (JUint) is supported by a number of programming environments which are primarily known by those skilled in the art as "Integrated Development Environments" (IDEs). An Integrated Development Environment (IDE) in more conventional environments can, for example, be packaged as an application program that includes a code editor, a compiler, a debugger, and a graphical user interface (GUI) builder. The IDE may be a standalone application or may be included as part of one or more existing and compatible applications. The BASIC programming language, for example, can be used within Microsoft Office applications, which makes it possible to write a WordBasic program within the Microsoft Word application. Generally, more modern Integrated Development Environments" (IDEs) provide a user-friendly framework for many modern programming languages, such as Visual Basic, Java™, and PowerBuilder. As such, a testing-framework, (e.g., JUnit Testing Framework) can be integrated into an expansive integrated programming environment which includes numerous applications and tools, thereby allowing the testing-framework and effectively the testing process to further benefit from the additional applications and tools which have been developed or can be developed in the future.

A Java™-based "Integrated Development Environment" (IDE) which supports JUnit, for example, allows use of "wizards" as a tool for creating test suites, generating automatic test cases, and so on. By way of example, one such Integrated Development Environment is primarily known as the "IntelliJ IDEA" which provides a comprehensive development environment for Java™ programming. "IntelliJ IDEA" provides a set of tools which are useful to developers in areas such as coding assistance and automation. Other Java™-based Integrated Development Environments, for example include "Eclipse," "Jbuilder," "Net Beans," as well as numerous others which have been or can be integrated with the JUnit testing-framework. The JUnit organization provides additional information about numerous Java™-based Integrated Development Environments or tools that can support the JUnit Testing Framework. It should be noted that the JUnit Testing Framework (JUnit) is supported by tools which may or may not be formally considered as a part of an "Integrated Development Environment" (IDE). By way of example, a builder-tool which is primarily known as the "Apache Ant" also supports the JUnit Testing Framework. The "Apache Ant," among other things, can be used to generate build files which assist in compilation of Java™ source code.

In view of the foregoing, it should be apparent that Integrated Development Environments (IDE) and tools that can support more formulized and automated testing of computer program code are highly useful and an increasingly important aspect of modern software development.

SUMMARY OF THE INVENTION

Broadly speaking, the invention relates to techniques for allowing software-tests to be supported by a development environment and/or tools that can assist the software-testing process. The development environment and/or tools typically supports a testing-framework that can, among other things, define the structure for test cases and/or tools that can be used to run the test cases. In accordance with one aspect of the invention, a dynamic-bridge which connects a collection of tests to a testing-framework is disclosed. This connection effectively allows the collection of tests to interface with the testing-framework. It will be appreciated that by connecting the collection of tests to the testing-framework, the dynamic-bridge allows the Integrated Development Environment (IDE) and tools that support the testing-framework to also support the collection of tests.

In one embodiment, the dynamic-bridge provides a dynamic test wrapper which can be dynamically constructed for a selected one or more tests in a collection of tests. It will be appreciated that dynamic wrapper "wraps" around a test to present it as a test which conforms to or is compatible with the testing-framework and can be executed within the testing-framework. In other words, the dynamic wrapper can present the test in a form which is acceptable by the testing-framework, simulate execution of the test in the testing-framework and report the results in a form which is acceptable (or expected) by the testing-framework to effectively present the test to the testing-framework and report the test results as expected.

It will be appreciated by those skilled in the art that the invention can be implemented in numerous ways, including as a method, an apparatus, a computer readable medium, and a computer system. Several embodiments of the invention are discussed below.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

As noted in the background section, Integrated Development Environments (IDE) and tools that can support more formulized and automated testing of computer program code are highly useful and increasingly important aspect of modern software development. As such, it is highly desirable to allow software-tests to be supported by an Integrated Development Environment (IDE) and/or tools that can assist in testing process (e.g., developing test cases, executing test cases, monitoring test progress, and reporting or recording test results). Unfortunately, some software-tests (e.g., proprietary tests which have already been developed) cannot be readily supported by an Integrated Development Environment or tools. In other words, it may not be possible or it may require a significant amount of effort to allow a proprietary test to be supported by an Integrated Development Environment (IDE) or tool that can assist the testing process.

Figure 1A:
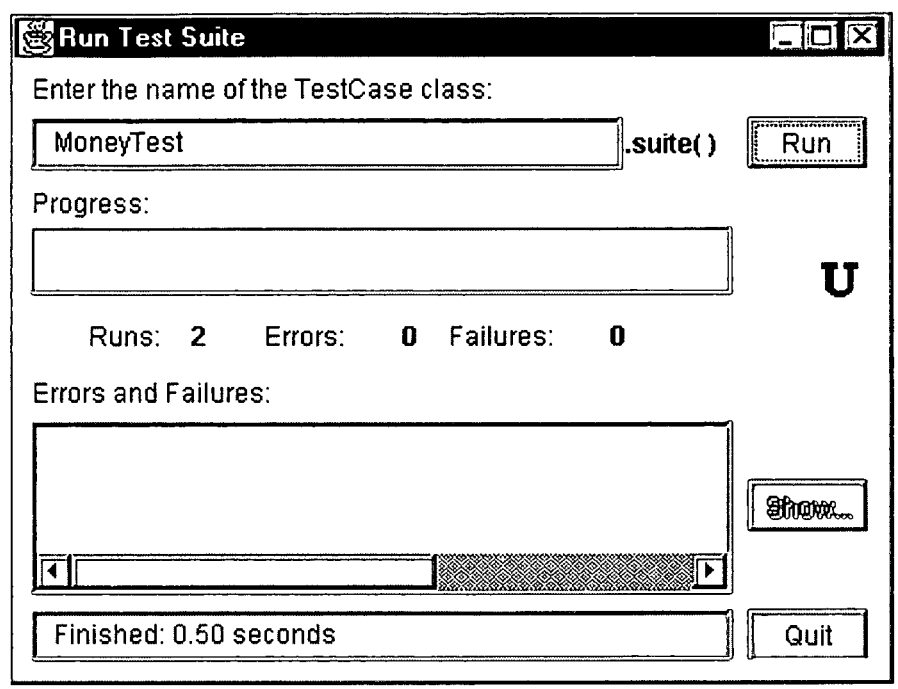
FIG. 1A depict an exemplary screen that demonstrates a successful execution of a test in JUnit Testing Framework.
Figure 1B:
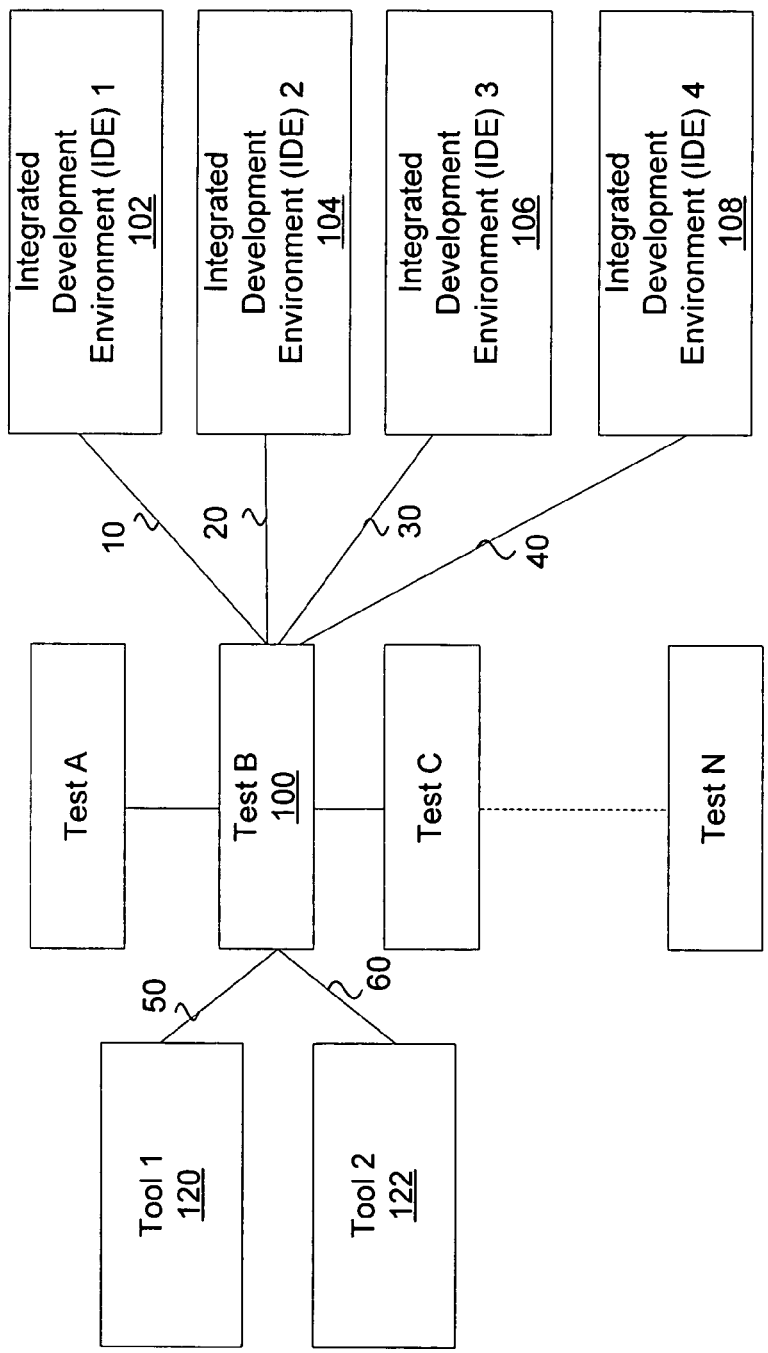
FIG. 1B depicts multiple connections or bridges which would be required to connect a single test to various Integrated Development Environments (IDEs)

More particularly, even assuming that a software-test (or "test") has been developed to conform to an Application Programming Interface (API) of an Integrated Development Environment (IDE) or tool, extensive efforts have to be made to, among other things, develop a Graphical User Interface (GUI) for the software-test which is consistent with that provided by the IDE and/or a tool that can assist the testing process. Moreover, it would still require additional effort to develop multiple connections (or bridges) that connect a software-test to each of numerous Integrated Development Environments (IDEs) or tools that have been developed and are likely to be developed in the near future. As shown in FIG. 1B, multiple connections or bridges (10, 20, 30, 40, 50, and 60) would be required to connect a single test 100 to various Integrated Development Environments (IDEs) 102, 104, 106 and 108, and tools 120 and 122.

However, developing or providing multiple connections between a software-test (e.g., test 100) and numerous other Integrated Development Environments and tools is not a cost effective solution as it would require a great deal of effort to connect just one test. Moreover, in some cases it may not be desirable or even possible to provide one or more connections (or bridges) for a test that does not conform to the API and/or GUI of a particular Integrated Development Environment (IDE) or tool. Therefore, there is a need for alternative techniques for allowing software-tests to be supported by an Integrated Development Environment or tool that can assist the software-testing process.

Broadly speaking, the invention relates to techniques for allowing software-tests to be supported by a development environment and/or tools that can assist the software-testing process. The development environment and/or tools typically supports a testing-framework that can, among other things, define the structure for test cases and/or tools that can be used to run the test cases. In accordance with one aspect of the invention, a dynamic-bridge which connects a collection of tests to a testing-framework is disclosed. This connection effectively allows the collection of tests to interface with the testing-framework. It will be appreciated that by connecting the collection of tests to the testing-framework, the dynamic-bridge allows the Integrated Development Environment (IDE) and tools that support the testing-framework to also support the collection of tests.

In one embodiment, the dynamic-bridge provides a dynamic test wrapper which can be dynamically constructed for a selected one or more tests in a collection of tests. It will be appreciated that dynamic wrapper "wraps" around a test to present it as a test which conforms to or is compatible with the testing-framework and can be executed within the testing-framework. In other words, the dynamic wrapper can present the test in a form which is acceptable by the testing-framework, simulate execution of the test in the testing-framework and report the results in a form which is acceptable (or expected) by the testing-framework to effectively present the test to the testing-framework and report the test results as expected.

Embodiments of these aspects of the invention are further discussed below with reference to FIGS. 2A-6C. However, those skilled in the art will readily appreciate that the detailed description given herein with respect to these figures is for explanatory purposes as the invention extends beyond these limited embodiments.

Figure 2A:
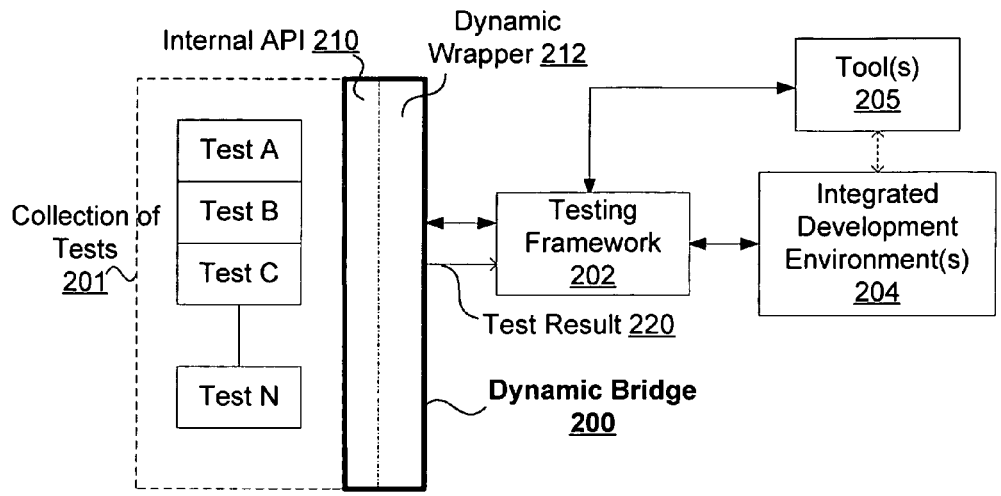
FIG. 2A-B depict a dynamic-bridge that can connect a collection of tests to a testing-framework in accordance with one embodiment of the invention.

FIG. 2A depicts a dynamic-bridge 200 that can connect a collection of tests 201 to a testing-framework 202 in accordance with one embodiment of the invention. It will be appreciated that the dynamic-bridge 200 allows the collection of tests 201 to be supported by one or more Integrated Development Environments 204 (IDEs) and/or tools 205 that assist the testing of the collection of tests 201 as if the testing was performed within the testing-framework 202. In other words, by making a connection between the collection of tests 201 and the testing-framework 202, the dynamic-bridge 200 effectively allows the IDE(s) 204 and/or tools 205 which support the testing-framework 202 to support the testing of the collection of tests.

As shown in FIG. 2A, the dynamic-bridge 200 may be represented as providing an internal API 210 and a dynamic-wrapper 212. The internal API 210 refers to a connection mechanism between the collection of tests 201 and the dynamic-bridge 200. The internal API essentially can provide an access mechanism for accessing the collection of tests and as such would be provided in consideration of the internal organization or structure of the collection of tests 201. The dynamic-wrapper 212 in effect can wrap each one of the tests in the collection of tests 201 and present them as a test which is in compliance or compatible with the testing-framework 202. In addition, the dynamic-wrapper 212 can determine test results and report them as test result 220 in a form which is acceptable or accepted by the testing-framework 202 (e.g., an API of the testing-framework 202). In any case, dynamic-wrapper 212 can construct a wrapper for one or more selected tests in the collection of tests 201 when desired (i.e., dynamically). Functionality of the dynamic-wrapper 212 is further described below.

Figure 2B:
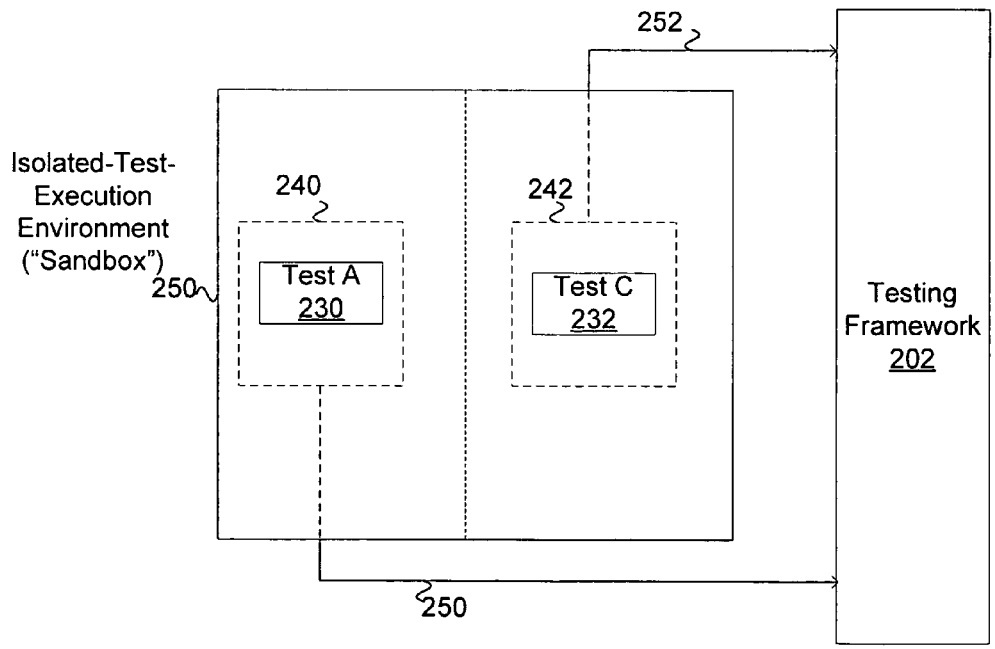

To further elaborate, FIG. 2B depict selected tests 230 and 232 selected from the test collection 201 (FIG. 2A) and respectively wrapped by wrappers 240 and 242 which effectively makes them conforming to and/or compatible with the testing-framework 202. It should be noted that the dynamic-wrapper layer 212 (shown in FIG. 2A) can effectively provide the wrappers 240 and 242 for the selected tests 230 and 232 of the collection of tests 201 (shown in FIG. 2A). Further, the dynamic-wrapper 212 (shown in FIG. 2A) can effectively initiate an isolated-test-execution environment (or "sandbox") 250 for executing the wrapped tests 240 and 242. It will be appreciated that the isolated test environment 250 isolates the tests 230 and 232 so that the result of one test does not adversely affect the result of another test. Furthermore, the result of testing 250 and 252 is respectively reported via the wrappers 240 and 242 to the testing-framework 202 (also shown in FIG. 2A).

Figure 3:
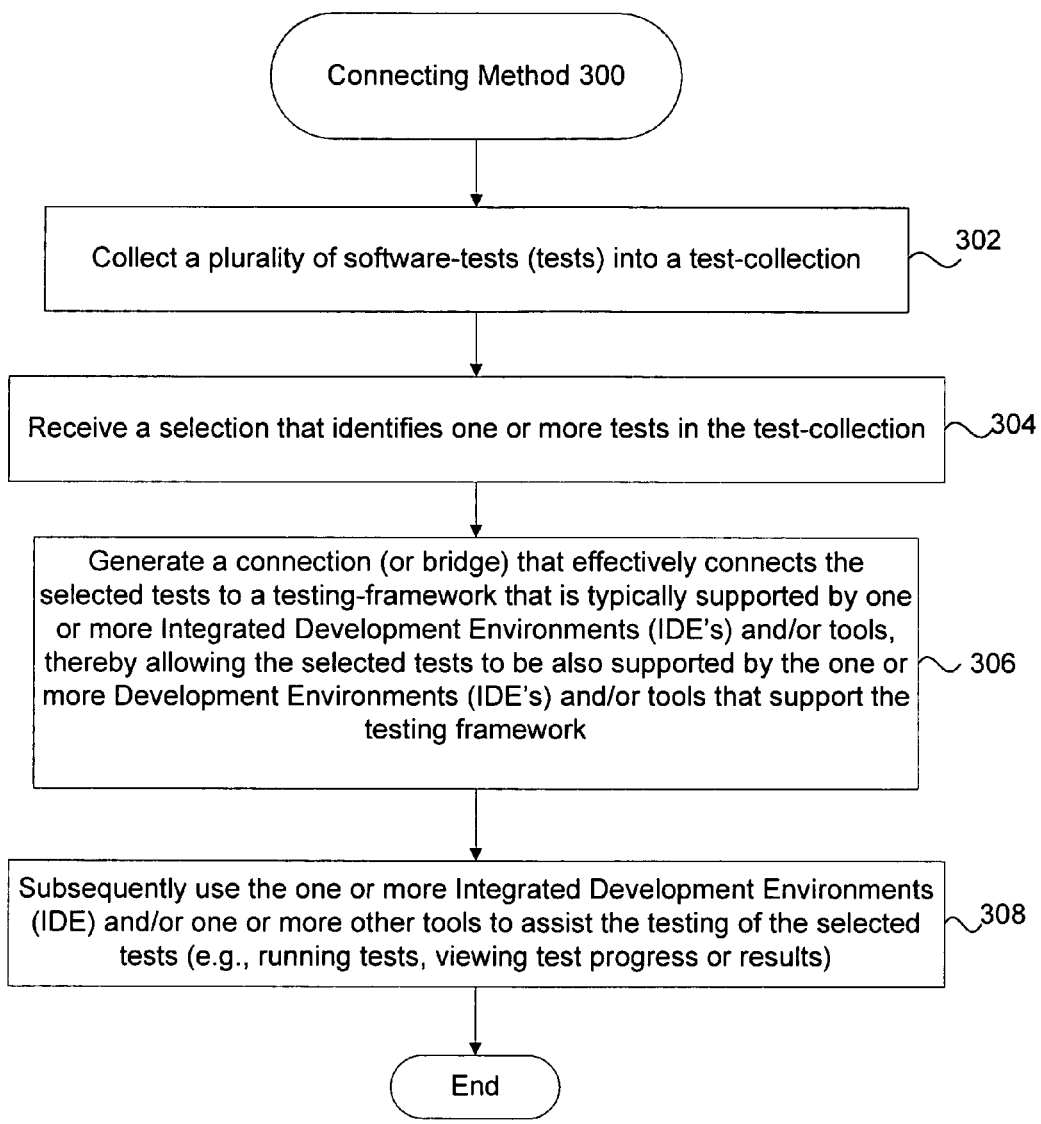
FIG. 3 depicts a connecting method for allowing a plurality of software-tests to be supported by one or more Integrated Development Environments (IDE) and/or tools in accordance with one embodiment of the invention.

FIG. 3 depicts a connecting-method 300 for allowing a plurality of software-tests to be supported by one or more Integrated Development Environments (IDE) and/or tools in accordance with one embodiment of the invention. The connecting method 300 can, for example, be used by the dynamic-bridge 200 (shown in FIG. 2A). Initially, a plurality of software-tests are collected (302) into a test-collection. Next, a selection that identifies one or more tests in the test-collection is received (304). The selection identifies one or more tests which are to be supported by one or more IDEs or tools that can assist the testing process. It should be noted that the one or more IDEs or tools are typically supported by a testing-framework. Thereafter, a connection (or bridge) between the selected tests and the testing-framework is generated (306). The connection effectively connects the selected tests to the testing-framework and allows the selected tests to interface with the testing-framework. The testing-framework is typically supported by one or more IDEs and/or tools which have or can be integrated with the testing-framework. As a result, the selected test can be supported by the one or more IDEs and/or tools that support the testing-framework. In other words, the connection (or bridge) effectively integrates tests which otherwise may be non-compliant or incompatible with the testing-framework and/or tools that support the testing-framework. Accordingly, the one or more IDEs or tools that can support the testing-framework can now support the selected tests after the connection has been generated (306). Subsequently, used to provide testing support (e.g., running test, viewing test progress or result).

Figure 4:
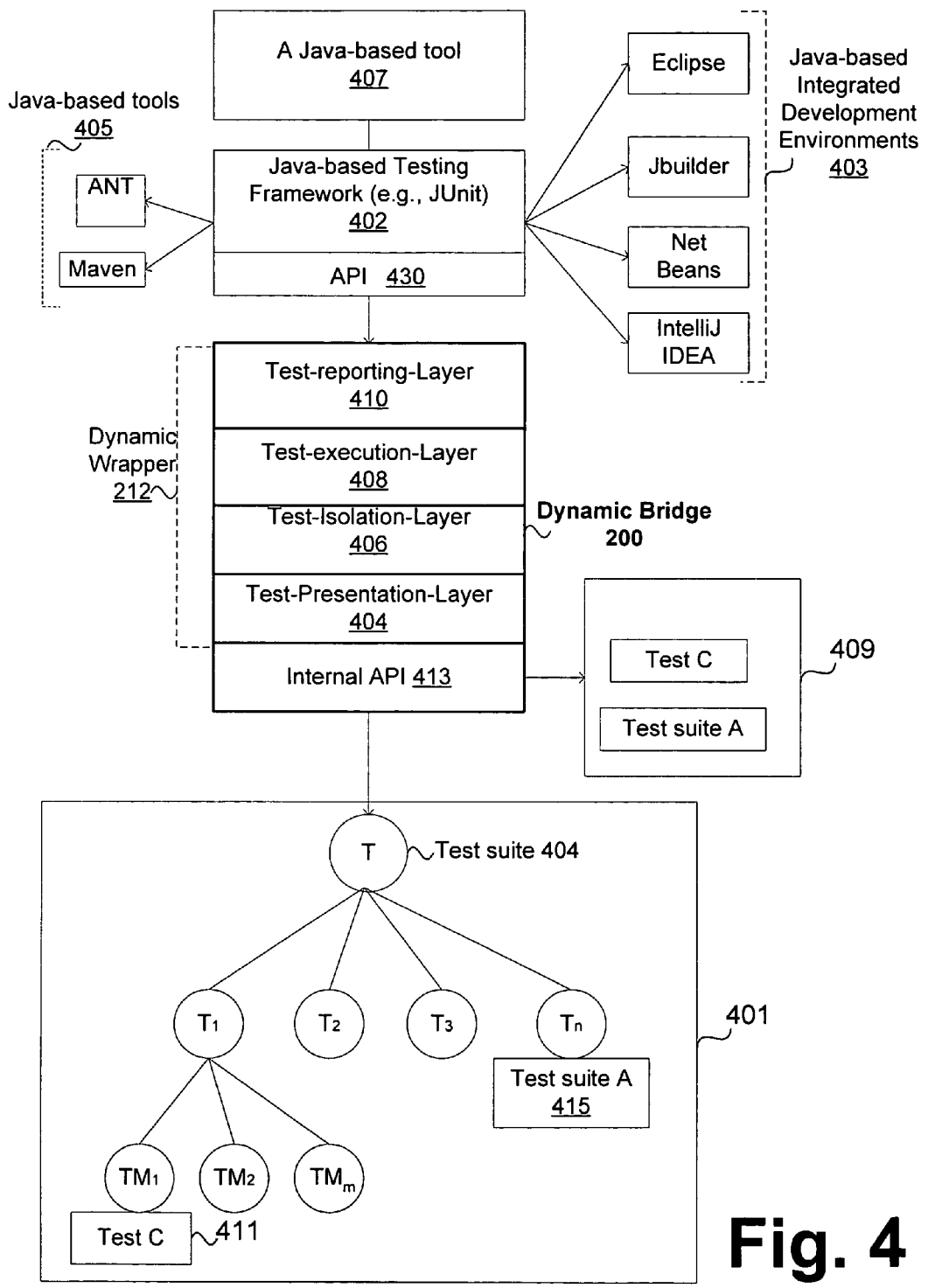
FIG. 4 depicts a dynamic-bridge in greater detail in accordance with another embodiment of the invention.

FIG. 4 depicts a dynamic-bridge 200 in greater detail in accordance with another embodiment of the invention. The dynamic-bridge 200 can selectively connect a collection of software-tests (tests) 401 to a Java™-based testing-framework (e.g., JUint) 402, thereby allowing the selected tests in the collection of tests (401) to be supported by various Java™-based Integrated Development Environments (IDEs) 403 and/or tools 405 which support the Java™-based testing-framework 402. The Java™-based testing-framework may, for example, be supported by various IDEs or tools which are known to those skilled in the art primarily as "Eclipse," "Jbuilder," "Net Beans," "IntelliJ IDEA," "ANT," "MAVEN," as well as numerous others which have been or can be integrated with the JUnit testing-framework. In general, the dynamic-bridge 200 effectively integrates the collection of tests 401 with a Java™-based testing-framework (e.g., JUnit), thereby allowing each test in the collection of tests 401 to be supported by a Java™-based tool 407 which has been or can be integrated with the Java™-based testing-framework 402. It should be noted that the tool 407 may be a tool which has been integrated into a Java™-based development environment (e.g., part of the IDE) or one which has not been formally integrated into an IDE (e.g., a builder tool that allows generating files that facilitate compilation).

Referring to FIG. 4, the collection of tests 401 are organized in a hierarchical representation which effectively represents the collection of tests as a test suite 409 which is divided into a number of tests or test categories ($T_1, \ldots, T_n$). Each of the tests or test categories ($T_1, T_n$) may be divided (or sub-divided) into tests, sub-categories, or subtests (e.g., $TM_1, \ldots, TM_m$), and so on. By way of example, test suite 409 may be represented as a root-directory which involves various directories or files (similar to a file system known to those skilled in the art). As such, an individual test-module 411 may be stored under a directory "$TM_1$" and a test suite 415 can be stored under another directory $T_n$. In any case, an internal API 210 of the dynamic-bridge 200 recognizes the organization of the collection of tests 201 and can be used to selectively access various tests in the test-collection 201 (e.g., tests 411 and 415). As a result, a test suite 409 can be constructed from the selected tests.

As shown in FIG. 4, the dynamic-wrapper layer 212 may be represented as having various architectural layers, namely, a test-presentation-layer 404, a test-isolation-layer 406, a test-execution-layer 408, and a test-reporting-layer 410. The test-presentation-layer 404 can, for example, include a compiler that compiles various selected tests in the test-selection 201 or formats or reformats tests to transform them to a form which is expected by or acceptable to the Java™-based testing-framework 402. In general, the test-presentation-layer 404 transforms the test suite 409 to a test suite which conforms to or is compatible with the testing structure defined by the testing-framework 402. The test-isolation-layer 406 can initiate an isolation ("sandbox") environment which is used by the text-execution-layer 408 to effectively execute the selected tests in isolation so that execution of one test cannot adversely affect the result of the execution of another test. As will be described below, the test-isolation-layer 406 and execution-layer 408 can, for example, be implemented in a virtual machine in accordance with one embodiment of the invention. The test-reporting-layer 410 determines the result of the execution of the tests and reports the result using the API 430 of the Java™-based testing-framework 402. In general, test reporting-layer 401 with conjunction of other layers effectively simulates execution of test in the Java™-based testing-framework 402 The test-reporting-layer 410 can, for example, be implemented as an exception-handler mechanism that is invoked when a test "throws" an exception as a result of a test-failure. "Throwing" an exception in Java™ programming language is well known to those skilled in the art. Nevertheless, the functionality of the test-reporting-layer 410 will be further described in greater detail in accordance with one embodiment of the invention.

Figure 5:
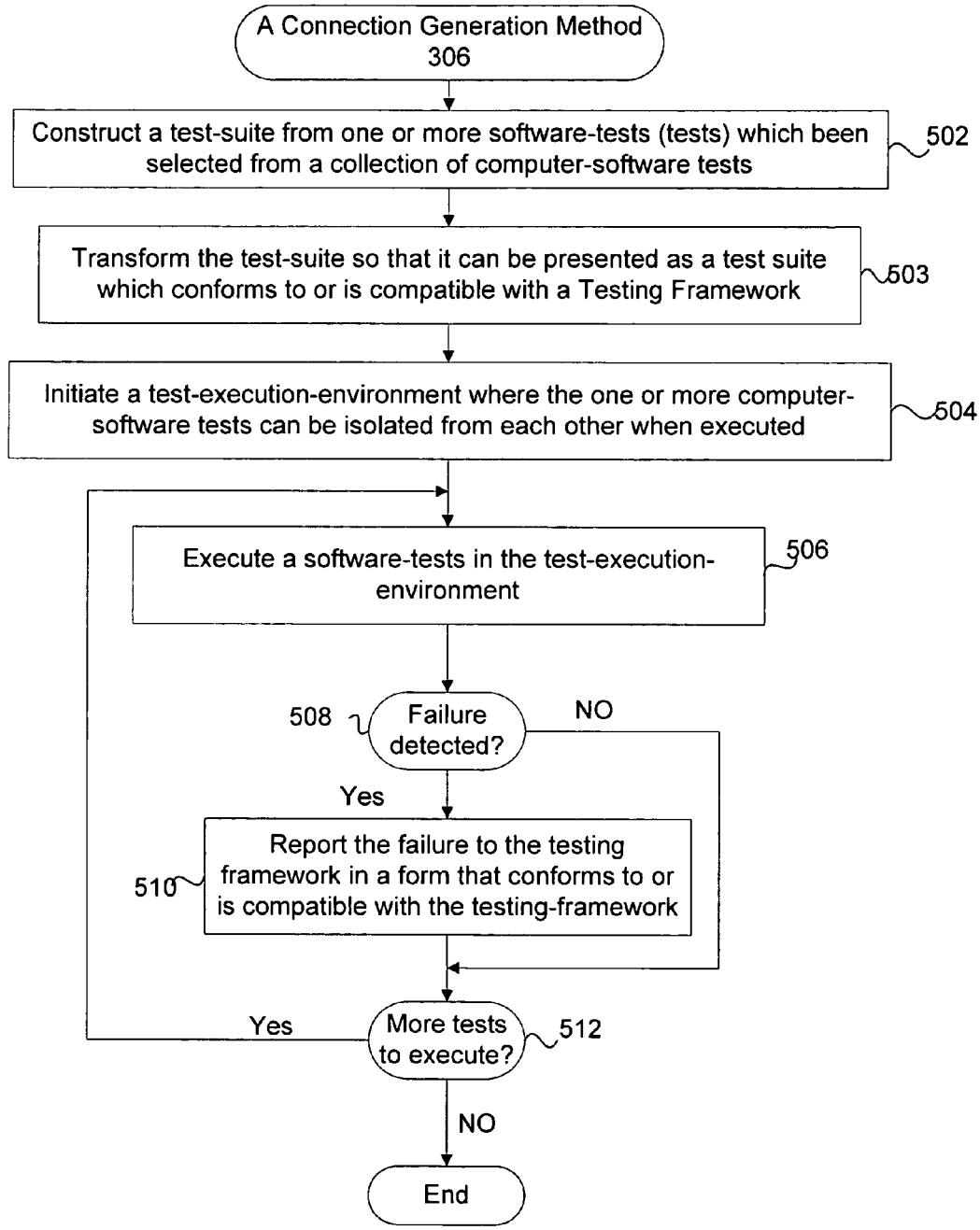
FIG. 5 depicts a connection generation method for generating a connection between a collection of tests and a Java™-based testing-framework (e.g., JUnit) in accordance with one embodiment of the invention.

Referring now to FIG. 5, a connection generation method 306 for generating a connection between a collection of tests and a Java™-based testing-framework (e.g., JUnit) is depicted in accordance with one embodiment of the invention. Initially, a test suite is constructed (502) from one or more software-tests (tests) which have been selected from a collection of software-tests. It should be noted that the test may not conform to and/or may not be compatible with the Java™-based testing-framework. However, the test suite is subsequently transformed (503) so that it can be presented as a test suite which conforms to or is compatible with the Java™-based testing-framework that is supported by one or more IDEs or tools.

Next, a test-execution-environment is initiated (504) where the one or more software-tests can be isolated from each other when executed. As will be discussed below, tests may be isolated, for example, by using thread-group and application-contexts mechanisms in a Java™ Programming Environment. Thereafter, a software-test is executed (506) in the test-execution-environment and it is determined (508) whether the executed test has resulted in failure (i.e., a failure has been detected). Accordingly, failure of the executed test can be reported (510) to the testing-framework in a form that conforms to or is compatible with the testing-framework (e.g., via an API defined for reporting testing failures to the testing-framework). However, no failure is reported if it is determined (508) that the executed test has not resulted in failure. In any case, subsequent to determining (508) whether the executed test has resulted in failure, it is determined (512) whether there is at least one more test to execute. If it is determined (512) that there are no tests to execute, the connection-generation method 306 ends. However, If it is determined (512) that there is at least one more test to execute, the connection-generation method 306 proceeds in a similar manner as noted above until it is determined (512) that there are no more tests to execute.

As noted above, a dynamic-bridge can connect a collection of software-tests to a Java™-based testing-framework (e.g., JUnit) in accordance with one embodiment of the invention. The dynamic-bridge allows the collection of tests to be supported by one or more Java™-based Integrated Development Environments (IDEs) and/or tools (e.g., ANT builder-tool) that can assist the testing process.

Figure 6A:
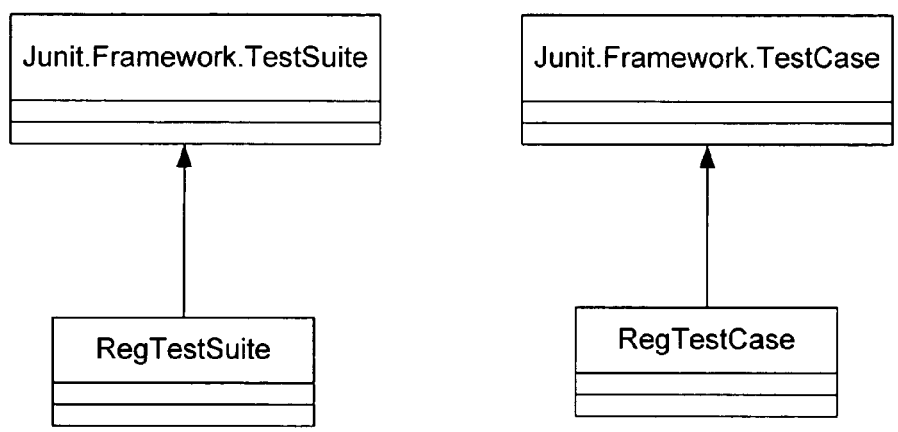
FIG. 6A depict Java™ class that can be used to implement a dynamic-bridge in a Java™ programming environment in accordance with one embodiment of the invention.
Figure 6B:
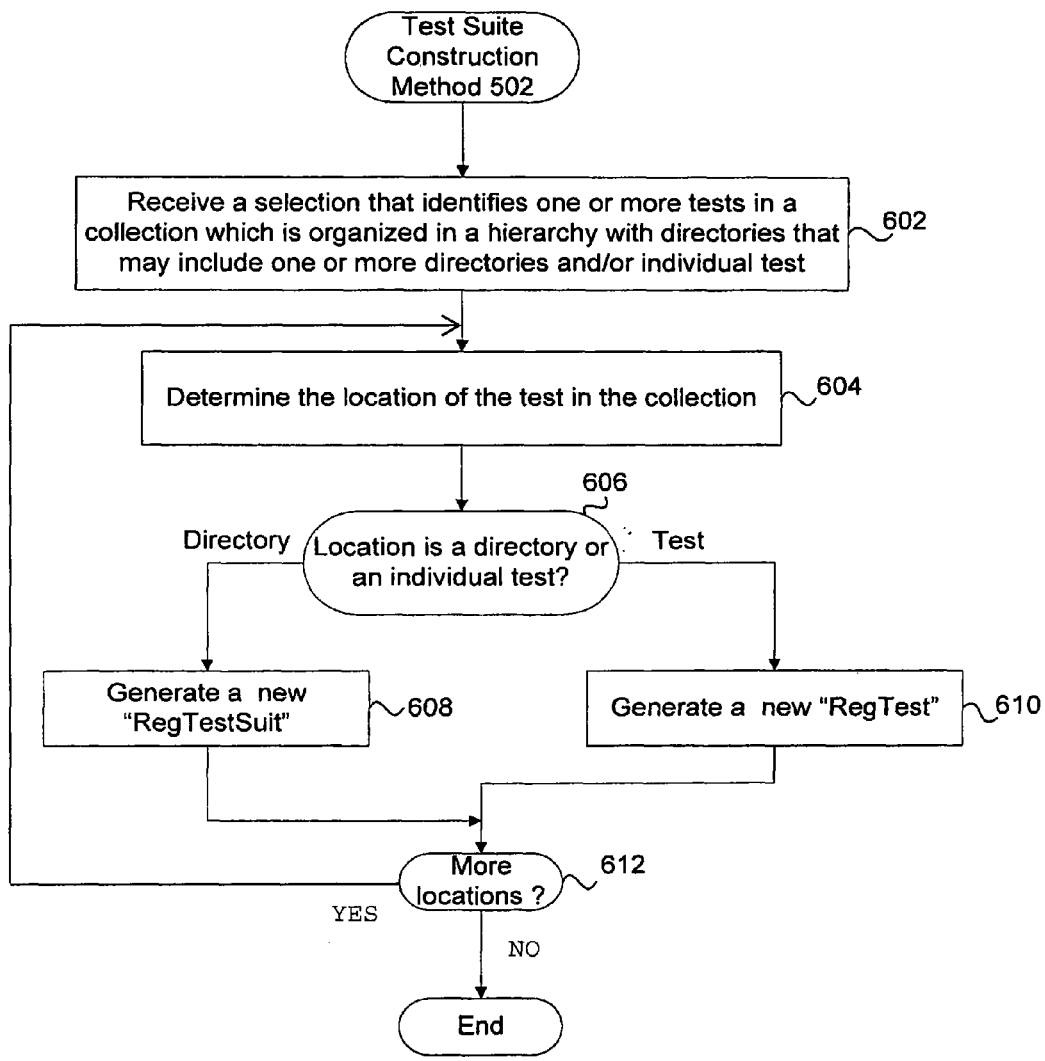
FIG. 6B depict a test construction method 502 for constructing a test suite from a collection of test is depicted in accordance with one embodiment of the invention.

As will be appreciated by those skilled in the art, a Java™-based dynamic-bridge can, for example, be implemented by providing "RegTestSuite" and "RegTestCase" classes which can be respectively associated with the "Junit.Framework.TestSuite" and "Junit.Framework.TestCase" classes of the JUnit Testing-framework (FIG. 6A). Accordingly, tests which do not conform to the JUnit Testing-framework (e.g., proprietary regression tests) can be collected as a test suite, for example, the "RegTestSuite" as depicted in FIG. 6B in accordance with one embodiment of the invention. The collected tests can, for example, be executed using the "RegTestCase" class (FIG. 6A) as depicted in FIG. 6C.

Referring now to FIG. 6B, a test suite construction method 502 for constructing a test suite from a collection of test is depicted in accordance with one embodiment of the invention. The test suite construction method 502 illustrates use of an exemplary "RegTestSuit" class with can be associated with the Junit.Framework.TestSuite known to those skilled in the art (FIG. 6A). Initially, a selection that identifies one or more tests in a collection of tests is received (602). It should be noted that the collection of tests are organized in a hierarchy with directories which may include one or more directories (test-directories) and/or individual tests (tests). Next, the location of a test in the collection of tests is determined (604). Subsequently, it is determined (606) whether the location is a directory or an individual test. Accordingly, a new "RegTestSuite" (FIG. 6A) which can represent a test suite including one or more individual tests can be generated (608) if it is determined (606) that the location is a directory. However, if it is determined (606) that the location is a test, a new "RegTest" is generated (610) which can represent an individual test. Thereafter, it is determined (612) whether there are no more locations to check. If it is determined (612) that there are no more locations to check, the method 502 ends. However, if it is determined (612) that there is at least one more location to check, the method 502 proceeds in a same manner as described above to either generate a "RegTestSuite" or a "RegTest." The test suite construction collection method 502 ends when it is determined (612) that there is no other location to check.

Figure 6C:
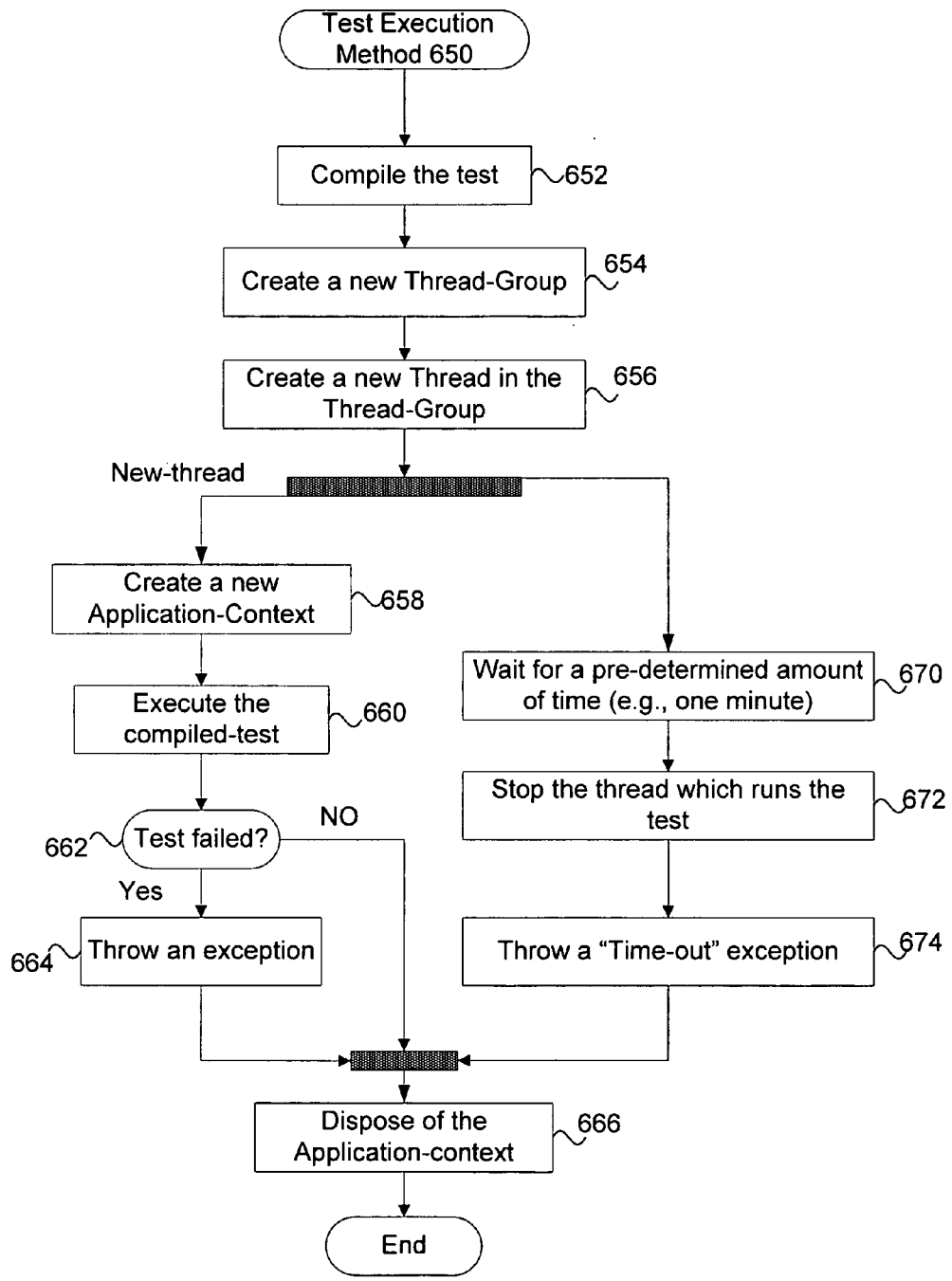
FIG. 6C depicts a test collection method 650 for executing (or running) a test in accordance with one embodiment of the invention.

FIG. 6C depicts a test execution method 650 for executing (or running) a test using an exemplary "RegTestCase" class (FIG. 6A) in accordance with one embodiment of the invention. Initially, a test is compiled (652). Typically, the test written in Java™ source-code (e.g., a proprietary test for regression testing) is compiled using a bytecode compiler to produce executable bytecodes. It will be appreciated that the compilation effectively "transforms" the test so that it is presented in a form that conforms to a Java™-based testing-framework (e.g., JUnit). The compilation process can, for example, be performed in accordance with techniques known in the art. Next, an execution environment for executing the tests are initiated by creating (654) a new "thread-group" which can effectively represent a group of execution threads (or threads). It will be appreciated that using a thread-group allows other threads that may be created by the test to be managed under the same thread-group. As shown in FIG. 6C, the execution in the new thread-group subsequently creates (658) a new application context. As will be appreciated by those skilled in the art, the application context will effectively isolate the execution of the test from other tests (i.e., test results and/or data created by the test can not be accessed by other tests). As known by those skilled in the art, an application context in the Java™ environment can effectively define the runtime environment and be used to shield applications (or Applets) from each other.

The compiled test which has been effectively transformed to a presentable form by the compilation (652) is executed (660) in the specific application-context which has been generated (658). Next, it is determined (662) whether the test has failed and an exception can be thrown accordingly (664). As will be appreciated by those skilled in the art, the exception can be handled by an execution-handler which uses the API of the Java™-based testing-framework to report the failure (e.g., method-failed API of JUnit as known in the art). If it is determined (662) that the test has not failed, no exception is thrown. In any case, after the execution (660) of the test, the application context is disposed (666) and the method 650 ends. It should be noted that all of the threads and/or effects (e.g., windows) created or caused to be created by the test are terminated by disposing of application-context and terminating the thread-group.

As shown in FIG. 6C, a "time-out" functionality may also be implemented to allow the execution of the test to terminate after waiting (670) for a predetermined amount of time rather than waiting indefinitely for execution of an individual test which adversely affects the testing process. Accordingly, after waiting (670) for a predetermined amount of time, the thread which runs the test can be stopped (672) if the application-context has not been already disposed (666) (i.e., the thread running the test is still active). In addition, a "time-out" exception failure can be thrown (674) which may be handled by a "time-out" handler that reports the failure using the API defined for JUnit.

The many features and advantages of the present invention are apparent from the written description, and thus, it is intended by the appended claims to cover all such features and advantages of the invention. Further, since numerous modifications and changes will readily occur to those skilled

What is claimed is:

1. A method for allowing a plurality of computer-software-tests to be supported by one or more integrated development environments, said method comprising:

collecting, utilizing at least one processor, a plurality of a computer-software-tests into a first collection of tests organized in a hierarchical representation, wherein each of said plurality of computer-software-tests can test computer program code, but at least one of said plurality of computer-software tests do not completely conform to a testing-framework and are not completely compatible with said testing-framework, said testing-framework defines at least one of a structure for test-cases that test computer program code and a structure for one or more tools that are operable to facilitate execution of said test-cases;

receiving, utilizing said at least one processor, a selection that identifies one or more nonconforming and incompatible computer-software-tests in said first collection which are to be supported by said one or more integrated development environments which support said testing-framework and are operable to assist testing in said testing-framework; and generating, utilizing said at least one processor, a connection between said one or more selected nonconforming and incompatible computer-software-tests and said testing-framework, said connection comprising an application programming interface to access the one or more selected nonconforming and incompatible computer-software-tests according to the hierarchical representation and a dynamic test wrapper to automatically generate a test-wrapper for each of the one or more nonconforming and incompatible computer-software-tests without user-input, and wherein each test-wrapper transforms the one or more selected nonconforming and incompatible computer-software-test from an unacceptable form to an acceptable form defined by the testing-framework and effectively simulates execution of the one or more selected nonconforming and incompatible computer-software tests within said testing-framework, thereby allowing said one or more computer-software tests to be supported by said one or more integrated development environments that support said testing-framework;

wherein said generating of said test-wrapper comprises:
constructing, from said one or more computer-software-tests, a test suite which includes said one or more computer-software-tests;
transforming said test suite to a conforming-test suite which conforms to or is compatible with said testing-framework;
initiating an isolated-test-execution environment for execution of said conforming-test suite, wherein said isolated-testing environment can effectively isolate execution of a first test-case in said test suite from execution of a second test-case in said test suite;
executing each computer-software test of said test suite in said isolated-test-execution environment;
determining whether execution of each computer-software test of said test suite has resulted in failure; and
reporting a failure to said testing-framework when said determining determines that execution of a test-case in said test suite has resulted in failure.

2. A method as recited in claim 1, wherein said transforming of said test suite comprises:
compiling said one or more computer-software-tests.

3. A method as recited in claim 2, wherein said compiling comprises: using a byte-code compiler to generate executable bytecodes.

4. A method as recited in claim 1, wherein said initiating of said isolated-test-execution environment comprises:
creating a thread-group for a test-case;
creating a thread in said thread-group; and
creating an application-context for said test-case.

5. A method as recited in claim 4, wherein said method further comprises:
disposing said application-context, thereby terminating all threads which have been created by said test case.

6. A method as recited in claim 1, wherein said reporting of a failure comprises:
using the application programming interface to report said failure.

7. A method as recited in claim 6, wherein said reporting of a failure further comprises:
throwing an exception; and
handling said exception by an exception-handler which interfaces with said Application Programming Interface (API).

8. A computer system which allows a plurality of computer-software-tests to be supported by one or more integrated development environments, wherein said computer system comprises:

at least one processor which receives computer program code that causes:

generating a connection between one or more nonconforming and incompatible computer-software-tests of a plurality of computer-software tests and a testing-framework, wherein each of said plurality of computer software-tests can test computer program code but at least one of said plurality of computer-software tests do not completely conform to said testing-framework and are not completely compatible with said testing-framework, wherein said testing-framework defines at least one of a structure for test-cases that test computer program code and a structure for one or more tools that are operable to facilitate execution of said test-cases, said connection comprising an application programming interface to access the one or more selected nonconforming and incompatible computer-software-tests according to a hierarchical representation and a dynamic test wrapper to automatically generate a test-wrapper for each of the one or more nonconforming and incompatible plurality of computer-software-tests without user-input, and wherein each test-wrapper transforms the one or more selected non-conforming and incompatible computer-software-test from an unacceptable form to an acceptable form defined by the testing-framework and effectively simulates execution of said one or more selected nonconforming and incompatible computer-software-tests within said testing-framework, thereby allowing said one or more nonconforming and incompatible computer-software tests to be supported by one or more integrated development environments that support said testing-framework and are operable to assist testing in said testing-framework;

wherein said generating of said test-wrapper comprises:
constructing, from said one or more computer-software-tests a test suite which includes said one or more computer-software-tests;
transforming said test suite to a conforming-test suite which conforms to or is compatible with said testing-framework;

initiating an isolated-test-execution environment for execution of said conforming-test suite, wherein said isolated-testing environment can effectively isolate execution of a first test-case in said test suite from execution of a second test-case in said test suite;

executing each computer-software test of said test suite in said isolated-test-execution environment;

determining whether execution of each computer-software test of said test suite has resulted in failure; and reporting a failure to said testing-framework when said determining determines that execution of a test-case in said test suite has resulted in failure.

9. A computer system as recited in claim 8, wherein said transforming of said test suite comprises:

compiling said one or more computer computer-software-tests.

10. A computer system as recited in claim 8, wherein said initiating of said isolated-test-execution environment comprises:

creating a thread-group for a test-case;

creating a thread in said thread-group; and creating an application-context for said test-case.

11. A computer system as recited in claim 10, wherein said method further comprises:

disposing said application-context, thereby terminating all threads which have been created by said test case.

12. A computer system as recited in claim 11, wherein said reporting of a failure comprises:

using the application programming interface to report said failure.

13. A computer system as recited in claim 12, wherein said reporting of a failure further comprises:

throwing an exception; and handling said exception by an exception-handler which interfaces with said Application Programming Interface (API).

14. A non-transitory computer readable medium including computer program code for allowing a plurality of computer-software-tests to be supported by one or more integrated development environments, said computer readable medium comprising:

computer program code, stored in at least one computer readable medium and executable by at least one processing unit, for collecting a plurality of a computer-software-tests into a first collection of tests organized in a hierarchical representation, wherein each of said plurality of computer-software-tests can test computer program code, but at least one said plurality of computer-software tests of do not completely conform to a testing-framework and are not completely compatible with said testing-framework, said testing-framework defines at least one of a structure for test-cases that test computer program code and a structure for one or more tools that are operable to facilitate execution of said test-cases;

computer program code, stored in the at least one computer readable medium and executable by the at least one processing unit, for receiving a selection that identifies one or more nonconforming and incompatible computer-software-tests in said first collection which are to be supported by said one or more integrated development environments which support said testing-framework and are operable to assist testing in said testing-framework; and computer program code, stored in the at least one computer readable medium and executable by the at least one processing unit, for generating a connection between said one or more nonconforming and incompatible selected computer-software-tests and said testing-framework, said connection comprising an application programming interface to access the one or more selected nonconforming and incompatible computer-software-tests according to the hierarchical representation and a dynamic test wrapper to automatically generate a test-wrapper for each of the one or more nonconforming and incompatible computer-software-tests without user input, and wherein each test-wrapper transforms the one or more of the selected nonconforming and incompatible computer-software-test from an unacceptable form to an acceptable form defined by the testing-framework and effectively simulates execution of said one or more selected nonconforming and incompatible computer-software-tests within said testing-framework, thereby allowing said one or more nonconforming and incompatible computer-software tests to be supported by said one or more software development environments or tools that support said testing-framework;

wherein said generating of said test-wrapper comprises:

constructing, from said one or more computer-software-tests a test suite which includes said one or more computer-software-tests;

transforming said test suite to a conforming-test suite which conforms to or is compatible with said testing-framework;

initiating an isolated-test-execution environment for execution of said conforming-test suite, wherein said isolated-testing environment can effectively isolate execution of a first test-case in said test suite from execution of a second test-case in said test suite;

executing each computer-software test of said test suite in said isolated-test-execution environment;

determining whether execution of each computer-software test of said test suite has resulted in failure; and reporting a failure to said testing-framework when said determining determines that execution of a test-case in said test suite has resulted in failure.

* * * * *